(12) United States Patent
Zucchelli et al.

(10) Patent No.: US 11,719,566 B2
(45) Date of Patent: Aug. 8, 2023

(54) DEVICES AND METHODS FOR MEASUREMENT OF LIQUID VOLUMES

(71) Applicant: Andrew Alliance S.A., Geneva (CH)

(72) Inventors: Peiro Zucchelli, Versonnex (FR); Giorgio Horak, Genèva (CH); Antoine Jordan, Veyrier (CH)

(73) Assignee: Andrew Alliance S.A., Geneva (CH)

( * ) Notice: Subject to any disclaimer, the term of this patent is extended or adjusted under 35 U.S.C. 154(b) by 458 days.

(21) Appl. No.: 16/942,982

(22) Filed: Jul. 30, 2020

(65) Prior Publication Data

US 2020/0355539 A1 Nov. 12, 2020

Related U.S. Application Data

(63) Continuation of application No. 15/736,413, filed as application No. PCT/IB2016/001168 on Jun. 17, 2016, now abandoned.

(60) Provisional application No. 62/182,163, filed on Jun. 19, 2015.

(51) Int. Cl.
*G01F 23/292* (2006.01)
*G01F 25/00* (2022.01)
*G01F 23/80* (2022.01)

(52) U.S. Cl.
CPC .......... *G01F 23/292* (2013.01); *G01F 23/806* (2022.01); *G01F 25/0084* (2013.01); *G01F 25/0092* (2013.01)

(58) Field of Classification Search
CPC .. G01F 23/292; G01F 23/806; G01F 25/0084; G01F 25/0092
See application file for complete search history.

(56) References Cited

U.S. PATENT DOCUMENTS

| | | | |
|---|---|---|---|
| 5,206,568 A | 4/1993 | Bjornson et al. | |
| 5,492,673 A * | 2/1996 | Curtis | G01F 25/0092 |
| | | | 422/922 |
| 6,814,095 B2 | 11/2004 | King | |

(Continued)

FOREIGN PATENT DOCUMENTS

| | | |
|---|---|---|
| CN | 104344863 A | 2/2015 |
| JP | H07507135 A | 8/1995 |
| WO | 95002166 A1 | 1/1995 |

OTHER PUBLICATIONS

Examination Report in European Patent Application No. 16770793.4 dated Dec. 9, 2020.

(Continued)

*Primary Examiner* — Jennifer Wecker
(74) *Attorney, Agent, or Firm* — Schmeiser, Olsen & Watts LLP

(57) ABSTRACT

Methods and devices for measuring the volume of a liquid sample transferred from a source to a destination by means of incremental dispensing of the sample into a destination vessel or by means of decremental aspiration of the sample from a source vessel, where the liquid sample is collected from a liquid having known optical absorbance at a known wavelength or within a defined part of the electromagnetic spectrum. The absorbance of the sample is measured by exposing the source or destination vessel to electromagnetic radiation before and after the transfer, and the liquid volume is determined on the basis of differential measurements of absorbance of the source or destination vessel.

10 Claims, 7 Drawing Sheets

(56) References Cited

U.S. PATENT DOCUMENTS

| | | |
|---|---|---|
| 2003/0107738 A1 | 6/2003 | Curtis |
| 2008/0237258 A1 | 10/2008 | Green |
| 2008/0275668 A1 | 11/2008 | Miller et al. |
| 2009/0250664 A1 | 10/2009 | Curtis et al. |
| 2010/0233822 A1 | 9/2010 | Prins et al. |
| 2011/0201099 A1 | 8/2011 | Anderson et al. |
| 2011/0253224 A1 | 10/2011 | Linder et al. |
| 2014/0248704 A1 | 9/2014 | Ueki et al. |
| 2015/0112629 A1 | 4/2015 | Hattori |
| 2016/0025752 A1 | 1/2016 | Santiago et al. |
| 2016/0167848 A1 | 6/2016 | Koschinat |

OTHER PUBLICATIONS

International Preliminary Report on Patentability in PCT/IB2016/001168 dated Dec. 28, 2017; 10 pages.
International Search Report and Written Opinion in PCT/IB2016/001168 dated Jan. 30, 2017; 14 pages.
Examination Report in European Patent Application No. 21166150.9 dated Jul. 14, 2021.

* cited by examiner

DEVICES AND METHODS FOR MEASUREMENT OF LIQUID VOLUMES

CROSS-REFERENCE TO RELATED APPLICATIONS

This application is a continuation of U.S. patent application Ser. No. 15/736,413 filed on Dec. 14, 2017, which is the U.S. national phase entry under 35 U.S.C. § 371 of International Application No. PCT/IB2016/001168, filed Jun. 17, 2016, titled DEVICES AND METHODS FOR MEASUREMENT OF LIQUID VOLUMES, which claims priority to and benefit of U.S. Provisional Application No. 62/182,163, filed Jun. 19, 2015, the contents of which are incorporated herein by reference in their entirety for all purposes.

FIELD OF THE INVENTION

The present invention relates to systems and methods for determining the volume of a liquid. More specifically, it discloses devices and methods for the measurement of liquid volumes transferred by means of liquid delivery devices, and quantified by an external system (hereby generically referred to as reader).

Liquid handling can be performed by means of manual tools—defined as pipettes—or automatic liquid handler. The volumetric quantification can be achieved by means of balances, scales, photometric, fluorescent or radiometric systems, or any system sensitive to a physical property proportional to the liquid volume.

BACKGROUND OF THE INVENTION

Liquid handling is a fundamental process for most biochemical, chemical and biological tests performed across multiple research laboratories and industries and is basically defined as the operation of transferring one sample into contact with another one and being able to quantify the amount of at least one of the samples to be used. Since the quantification of the sample is a crucial requirement for the liquid handling processes, the liquid transfer must be accurate within acceptable laboratory tolerances and reproducible. The reproducibility and accuracy of liquid handling are achieved by means of liquid handling devices, which can have a single or multiple channels, limited to a certain volume range, configured to simultaneous or sequential delivery that can be automated or manual.

Most prior art liquid delivery devices suffer from problems with calibration and maintaining accurate measurements and specifications given by the manufacturer. For this reason, it is necessary to periodically control and validate the amount of transferred liquids to ensure the integrity of the liquid handling process. The validation of the correct amount of dispensed liquid is so important that there are international standards to regulate the necessary requirements for liquid handling devices. An example is the ISO 8655:2002 standard that is written specifically to define the requirements of having accurate and reproducible calibrations of piston pipettes and closely-related measurement equipment.

Beyond established laboratory standards, there is an obvious utility in quantifying, promptly without delay and with the required accuracy, the performances of a liquid handler—both for commercial and purity reasons—once it is considered, for example, that many drugs and vaccines are produced through liquid handling procedures.

The primary methodology for the measurement of the amount of dispensed liquids is thought gravimetric measurement analysis. The liquid volume is determined by the measurement of the liquid weight by means of a balance. The conversion from liquid weight to liquid volume must take in account the evaporation rate of the liquid during the dispensing and measurement process, and the impact of the room temperature and the atmospheric pressure to the ratio of mass and volume (also known as density). Unfortunately, this technique has various limitations. First, it is time consuming, in particular for multichannel device. Secondly, it is very sensitive to changes of the environmental parameters such as temperature instability and irregular evaporation. Moreover, balances must be perfectly isolated by vibrations in order to avoid errors which can be corrupted the measurement of the liquid weight: so, they cannot be used in conventional environments.

Another suggested method to measure the volume of liquid dispensed by a liquid handling device relies on a certain optical absorbance of the sample. The volume of a liquid sample collected by a liquid handling device can be inferred by the change of absorbance of the source, by the absorbance of the collected sample, or by the change of absorbance of the destination. Absorbance in its turn can be measured by projecting a certain amount of light onto any sample, and measuring the energy loss within the sample. Given a known geometry and known absorbance properties, it can be easily evinced that a suitable configuration can provide an optical measurement of a liquid volume. This technique is essentially based on the Beer-Lambert law that relates the attenuation of the light to the properties of the material thought which the light is travelling. The light absorption is proportional to the distance that the light travels thought the liquid (i.e. path length) and its concentration. In one possible implementation of the Lambert Beer law (but the disclosed methods are not limited to it), filling a container with a constant or known cross section by a liquid with defined absorbance properties, allows determining the liquid volume through an estimation of the path length deducted from the measured absorbance—provided that the light beam shines onto the liquid in a direction where the path length is proportional to the overall volume. In another implementation, photometric methods can be used to infer the liquid volume based on a change of the concentration of an existing sample, at constant or variable path length of the measurement beam inside a certain liquid.

Photometric measurements can be made faster than gravimetric methods since they don't require mechanical stabilization, and can also be performed in parallel. They can be made less sensitive to environmental parameters such as temperature variations, liquid evaporation and vibrations. However, the accuracy and the reproducibility of this technique can be influenced by the optical quality of walls of the sample container. Even though the material of the contains is transparent to the light beam, the presence of scratches, irregularity of the surface and local defects in the container material can diffuse and/or absorb the light which goes thought the sample. Those additional loses cause an error in the measurement since they decrease the amount of light that goes to the reader sensor. For the same reason, the photometric technique is influence also by the presence of external particles (e.g. dust) on the container surface thought with the light is travelling. Such particles can absorb or scatter the light generating additional losses. Additionally, suitable calibration methods have to be envisaged in order to provide an absolute method of determining the volume, where the correlation factor between absorbance and the liquid volume has to be precisely known.

In various situations, managing sample solutions of known and constant optical absorption may constitute an issue. For example, absorbing dyes may be photosensitive, and change their absorption properties when stored in direct sunlight. Also, solutions may degrade due to unexpected biological activity, like presence of bacteria in solution or fungi. In open containers, the contact with air humidity may dilute samples, or change the pH conditions that may affect the dye absorbance and general optical properties. So, the industry could benefit of a packaging solution maintaining the samples in the best possible and controlled conditions up to the moment of use, possibly as a mono-dose. In terms if automation, such a requirement calls for the determination if a mono-dose has been already used or not, in order to avoid the generation of new data based on samples with unknown absorption.

Challenges increase when dealing with the characterization of liquid handling performances of automatic systems, also called liquid handlers. In this case, the systems are mainly equipped with multiple dispensing and aspiration heads, resulting in a dramatic complication (especially when these heads cannot be operated independently), since most gravimetric solution have a single measurement capability and it is technically difficult and expensive to extend the device capabilities to measure the weight of multiple and independent samples. A photometric system is much more suitable to parallel measurements, and therefore better adapted to the calibration of multi-channel systems and liquid handlers.

SUMMARY OF THE INVENTION

The present disclosure is directed towards an apparatus and methods for a precise, fast and convenient measurement of the liquid volumes dispensed by a liquid delivery device. This method is particularly useful to verify that the transferred liquid by the liquid delivery device is within certain specifications and tolerances.

In one aspect of the present disclosure, a method for determining the volume of a liquid sample having a known optical absorbance at a defined wavelength or optical spectrum includes measuring an absorbance of a first volume of a liquid sample in a destination vessel based on an optical beam passing through the first volume of the liquid sample in the destination vessel, wherein the optical beam crosses an unconstrained liquid surface. A second volume of the liquid sample is dispensed into the destination vessel. An absorbance of the first and second volumes of the liquid sample in the destination vessel is measured based on the optical beam passing through the first and second volumes of the liquid sample in the destination vessel, wherein the optical beam crosses the unconstrained liquid surface. The second volume of the liquid sample is determined based on a difference of the measurements of the absorbance of the first volume and the absorbance of the first and second volumes.

The method may include dispensing the first volume of the liquid sample into the destination vessel before measuring the absorbance of the first volume. The method may further include aspirating the first volume and aspirating the second volume from a source vessel prior to dispensing the first volume and dispensing the second volume, respectively.

The liquid sample may include a known concentration of a light-absorbing dye. The unconstrained liquid surface may have a meniscus shape.

The method may include dispensing a third volume of the liquid sample into the destination vessel, measuring an absorbance of the first, second and third volumes of the liquid sample in the destination vessel based on the optical beam passing through the first, second and third volumes of the liquid sample in the destination vessel, wherein the optical beam crosses the unconstrained liquid surface, and determining the third volume of the liquid sample based on a difference of the measurements of the absorbance of the first and second volumes and the absorbance of the first, second and third volumes.

In another aspect of the present disclosure, a method for determining the volume of a liquid sample having a known optical absorbance at a defined wavelength or optical spectrum includes measuring an absorbance of a first volume of a liquid sample in a vessel based on an optical beam passing through the first volume of the liquid sample in the destination vessel, wherein the optical beam crosses an unconstrained liquid surface. A second volume of the liquid sample is aspirated from the vessel and an absorbance of a first remaining volume of the liquid sample in the vessel is measured after the aspiration of the second volume based on the optical beam passing through the first remaining volume, wherein the optical beam crosses the unconstrained liquid surface and wherein the first remaining volume is defined as a difference between the first and second volumes. The second volume of the liquid sample is determined based on a difference of the measurements of the absorbance of the first volume and the absorbance of the first remaining volume.

The liquid sample may include a known concentration of a light-absorbing dye. The unconstrained liquid surface may have a meniscus shape.

The method may further include aspirating a third volume of the liquid sample from the vessel. An absorbance of a second remaining volume of the liquid sample in the vessel is measured based on the optical beam passing through the second remaining volume of the liquid sample in the vessel after aspiration of the third volume, wherein the optical beam crosses the unconstrained liquid surface and wherein the second remaining volume is defined as a difference between the first remaining volume and the third volume. The third volume of the liquid sample is determined based on a difference of the measurements of the absorbance of the first remaining volume and the absorbance of the second remaining volume.

DETAILED DESCRIPTION OF THE INVENTION

Figure 1:
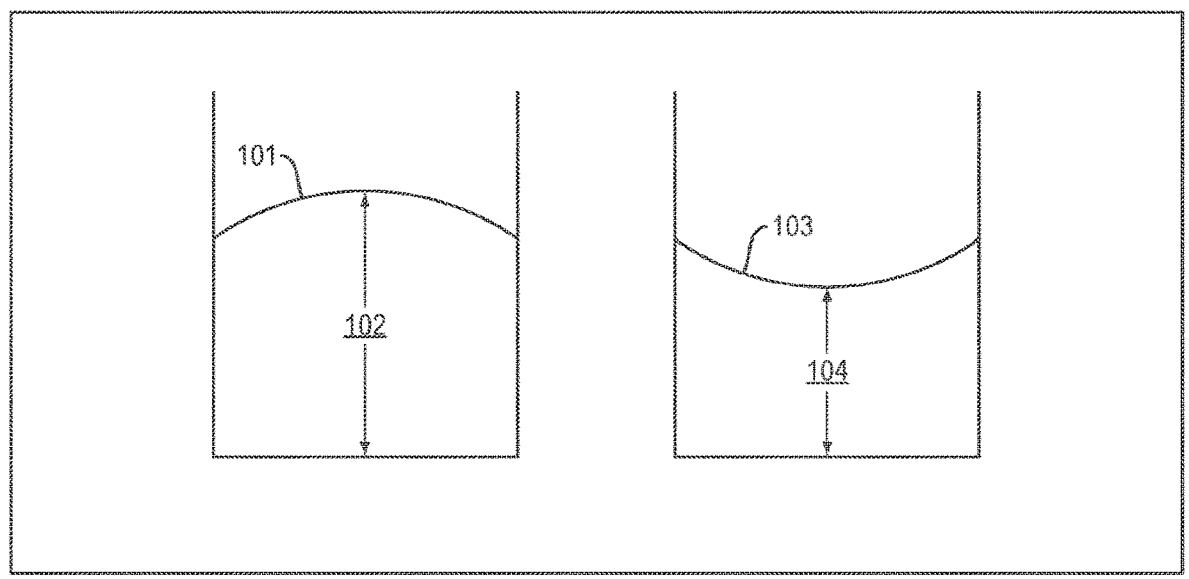
FIG. 1 shows a schematic scenario of the possible shapes of the liquid meniscus present in the destination vessel. The difference of optical path with respect to the ideal case is shown.

The present invention relates to the measurement of liquid volumes, as well as a number of its applications. For the purpose of illustration, the drawings as well as the description will generally refer to the apparatus addressing this solution as differential measurement of liquid volumes. However, the means disclosed in this invention are equally applicable to more general embodiments in the field of liquid handling.

General Description of a Differential Measurement of Liquid Volumes

The principle of a photometric evaluation of a volume relies mainly on the absorbance of a sample with known absorbance in a known optical configuration and at a known wavelength. The Lambert-Beer law determines the light Transmission T for a beam of light traversing a liquid, and it can be expressed as:

$$T = I/I\_0 = 10^{(-\varepsilon l c)}$$

Where $\varepsilon$ is the extinction coefficient of the absorbing sample, l is the length of the light beam across the liquid (path length), and c is the concentration of the sample inside the liquid (typically, a dilution buffer). Absorbance is consequently defined as $$A = \varepsilon l c$$

And A is typically the variable that's reported by conventional laboratory absorbance photometers.

Many different experimental conditions can be envisaged to exploit the Lambert-beer law principle and correlate an absorbance measurement with an unknown sample volume. The most obvious geometry consists of a cuvette where the light beam transverses a constant path length, independent from the volume of the liquid. In this configuration, mixing two liquid volumes with different absorption properties induces a change of concentration, detectable by the photometer through the measurement of the light transmission. For example, the standard ISO-8655-7 suggests different experimental conditions to achieve a volume measurement, by diluting an existing dye with a transparent buffer or, vice-versa, by adding a dye to a transparent liquid.

In this context, it is contemplated within the scope of the disclosure to highlight the form of the Lambert-Beer law in relation with the transmission of a light-absorbing sample of volume V and with an initial concentration c when introduced into a container of constant cross-section S, initially containing a Volume V\_Buf of non-absorbing buffer. If the light beam travels in the direction orthogonal to the container cross-section, the addition of sample modifies simultaneously the concentration and the path length of the light beam. So the absorption becomes $$A = \varepsilon (V + V\_Buf)/S \times (c \times V)/(V + V\_Buf) = \varepsilon c/S \times V$$

It can be noted that the final absorbance is proportional to the sample Volume V, being $\varepsilon$, S and the initial concentration c constant parameters. According to the disclosure implementation of this configuration into a clear-bottom microplate well that's measured by means of a vertical light beam, provided that the well has a constant cross-section (typically, with a circular or rectangular shape), is contemplated within the scope of the disclosure. In this geometry, the light beam absorbance measurement is directly proportional to the volume of the dye loaded with a pipette onto the same well. Also, it should be noted that the factor $c \times V = Q$ corresponds to the amount of dye molecules that have been loaded into the well: in other words, if we assume that the dye molecules don't evaporate (an hypothesis justified in many experimental conditions by the large molecular weight of the dyes—for example Ponceau S corresponding to MW=760.57) we expect that, in the hypothesis that neither precipitation or staining would occur, the absorbance of the sample will be insensitive to the water evaporation over time. Without being bound to any particular theory, these hypotheses have been experimentally verified.

It is easy to highlight advantages and disadvantages of this specific experimental configuration of an absorbance procedure with respect to a gravimetric procedure. Primarily, minute and variable volume samples can be loaded into a buffer-containing array of wells, with reduced sensitivity to sample evaporation. This subsequently allows the possibility of a readout of all wells in parallel, something impossible by a gravimetric measurement, with a significant gain of time.

In practice, in this specific geometrical configuration the photometric method is sensitive to the total amount of dye present in a certain vessel, and the absorbance depends linearly on the amount of dye Q that's present in the vessel. In the hypothesis of a container with a constant cross section (for example but not limited to, a cylinder or a parallelepiped), it can be remarked that the proportionality factor between absorbance and the quantity of dye is a constant, and it's independent on the actual liquid volume present in the vessel. In this configuration, it's sufficient to know the concentration of the original dye in a certain solution that it becomes possible to quantify, precisely and independently from many systematic errors, the volume of liquid that's added into the vessel through the differential measurement of the absorbance changes of the vessel in consideration.

The current disclosure is based upon differential measurement of the absorbance of multiple dispensing steps of calibrated sample solutions, at identical or different concentration, providing information to correct measurement errors generated by possible quality defects of the destination vessel and presence of external particles along the path of the light beam. This aspect of the invention leads to a more precise, accurate and robust measurement of the liquid volumes.

It should be noted another important advantage of a differential measurement of liquid volumes that emerges when the solution is applied to an automated system like a liquid handler. By means of a microplate solution, for example, it's definitely possible to increase the throughput of the system to parallel measurement, especially valuable for multi-channel systems. This feature simplifies the process and accelerates the operation; however, the need of repeating multiple measurements for the same dispensing channel—required for the determination of random errors, for example—implies the necessity of using a large number of measurement vessels, and a microplate, which has a limited number of available wells, for example 96 or 384 or 1536 wells. In the case of manual pipetting, it's obviously possible for a user to exploit multiple microplates, and load the microplates onto the photometric reader when required.

However, in an automated environment this necessity would imply the integration of a loading system, or a microplate stacker, in order to perform a sufficient number of measurements for each channel. This additional complexity has a cost, and additionally introduces the complication of consumable to consumable variability that will imply additional redundancy of the measurements. By differential measurements, however, it's definitely possible to reuse the same consumable, by simply aspirating the liquids when they would approach the maximum capacity of the individual wells or vessels, and dispensing the liquid again to perform an incremental measurement. So, it becomes possible to use a single consumable, possibly pre-loaded onto the reader, that's accessed by the liquid handling system or user in a continuous way, alternated to partial readings of the reader. It should be noted too that aspiration of the liquid can be either a passive, service operation to maintain the system in a valid configuration or indeed constitute an essential and valid step of the measurement, determining the aspiration volumetric performances of the device.

General Description of a Compensation of Shape of the Liquid Meniscus

In another aspect of the present disclosure, a coloured buffer is used in order to calculate the optical background of the absorbance measurement. The use of coloured buffer coupled with differential measurement of the absorbance compensates the signal variations related to the different shapes of the meniscus of the liquid present in the destination vessel. As shown in FIG. 1, the different shapes of the liquid meniscus imply different optical paths for the same volume and the same geometry of the vessel. FIG. 1 shows also the ideal shape of the meniscus 105. Since the calculation of the liquid volume in the destination vessel is based on a measurement of the optical path of the light beam going through the sample solution, the error introduced by the variation of the meniscus can be severe. For a given liquid volume in the vessel, a convex meniscus 101 will produce a longer optical path 102 and a concave meniscus 103 will produce a shorter path 104. Then the result of the optical background measurement using coloured buffer will give a higher value of the initial absorption in case of convex meniscus.

Subsequently, if the same amount and type of sample solution is added to both vessels, the absorption will increase identically for both vessels, providing that the sample solution does not change the meniscus of the liquid already present in each vessel. Since the total absorption of the sample solution contained in the vessel with convex meniscus is higher than the one with concave meniscus, the conventional photometric technique will overestimate the amount of liquid in case of convex meniscus and will underestimate it in case of concave meniscus. On contrary, the current method measures the absorption of the sample solution by differential measurement, so both amount of liquid will generate the same differential absorption, independently from the meniscus shape of the liquid. It can be remarked that the coloured buffer can be suitably chosen to alter and modify the meniscus shape of the measurement solution. For example, the contact angle can be changed by adding detergents to the coloured buffer, altering the meniscus of the mixture in a favourable manner according to the vessel material involved.

Figure 2:
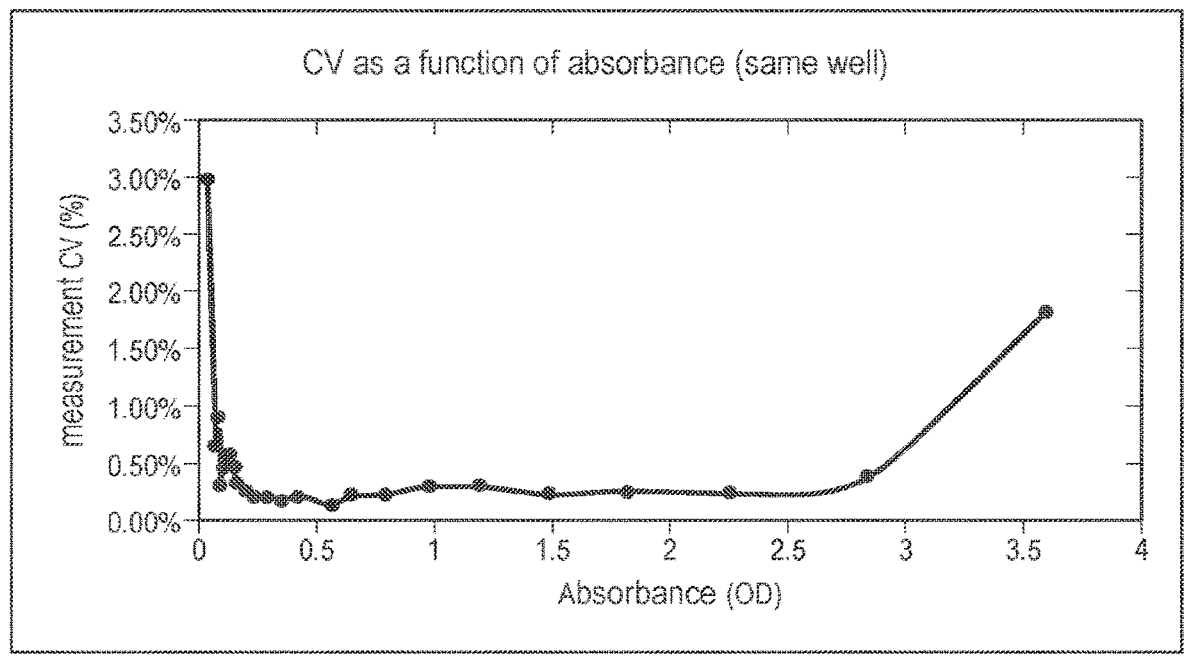
FIG. 2 shows the relative standard deviation (CV) of a commercially-available spectrometer based on consecutive readings as a function of the absorbance.

General Description of an Optimization of Absorption Signal as Function of Reader Performances In further aspect of the present invention according to the disclosure, in order to contain random errors introduced by the reader, a coloured buffer is used to shift the experimental regime of the signal in the dynamic range of the reader where its performances are more precise and accurate. FIG. 2 shows the relative standard deviation (CV) based on 30 consecutive readings as a function of the absorbance. The use of the coloured buffer allows generating data for background measurements in the region where the statistical error contribution is minimal. For the same purpose, the use of the coloured buffer avoids the need of solutions with very high concentrated dyes for detecting small volumes. In fact, highly concentrated dye can induce formation of dimers or higher-order aggregates that have different absorption property of the single chromophore.

General Description of Method to Compensate the Dependence of Liquid Volume Measurement From Vessel-To-Vessel Variation In another illustrative embodiment, the use of a coloured buffer and differential absorption measurement minimizes the errors of inaccuracy and reproducibility related to the variability in the dimensions of the moulded plastic part of multi-well plates once they are used as measurement vessel. The variation related to the manufacturing process can produce variability among wells and among plates. Those variations could have an impact on the geometry of the well and on the shape of the meniscus of the dispensed liquid. The use of different absorbance measurements and background subtraction based on a coloured buffer minimizes the dependences from variation of the well dimensions since their contributions are subtracted at each differential measurement.

The use of the coloured buffer can be used as a method capable to assess, a-priori, the well and micro-plate variations—for example to understand if the effective well cross section corresponds to the nominal one. A number of phenomena, for example, a particle at the bottom of the well or a manufacturing defect, could limit to the optical path cross section and therefore modify the absorbance of the well. However, the coloured buffer measurement could act as a reference, actually measuring the vessel cross section and optical transparency after all, allowing for a subsequent differential measurement when the sample is inserted and a correction based on the coloured buffer result vs. the average well behaviour or expectation.

General Description of Measurement of Liquid Volumes Bigger Than Vessel Capacity In yet another aspect of the present invention, a method to measure liquid volumes bigger than the maximum capacity of the destination vessel is possible by means of integral measurements of the absorbance of the aliquots of unknown volume. The amount of liquid to be measured is dispensed as aliquots into multi-well plate or into multiple destination vessels. Even if the individual aliquots have an unknown volume, the amount of dye distributed among the vessel is proportional to the total absorbance, and the total absorbance is proportional therefore to the total volume in the assumption that all the liquid has been dispensed. The total amount of volume can therefore be calculated by integrating the absorbance of each vessels.

According to the disclosure, the described method can be combined to the colored buffer principle described above, in order to exploit the advantage of a physical measurement of the vessel characteristics and also optimization of the reader performances in a suitable optical density regime. In another illustrative embodiment, the aliquots can also be dispensed in the same destination vessel and the measurement of aliquot volume is achieved by differential absorbance measurements, allowing—if combined with aspiration steps and subsequent measurement of the absorbance—to minimize possible systematic errors due to well-to-well disuniformities.

General Description of Method to Re-Use the Sample Solution

In a further illustrative embodiment of the present disclosure, a previously dispensed sample solution is re-used in a subsequent measurement. Such method is particularly useful for the characterization of the dispensing performances of liquid delivery devices, since it allows comparing the amount of liquid aspirated to the amount of liquid that's dispensed. In fact, the total amount of sample solution is then equal to only to the volume required for the first liquid dispensing step.

According to such method, the sample solution, previously used for the absorbance measurement, is then removed from the destination vessel and the volume present in the vessel is re-measured by means of differential measurement. Subsequently, the sample solution can be re-dispensed into the destination vessel and new measurement can be performed again, in similar but different experimental conditions. It is contemplated within the scope of the disclosure that possible buffer evaporation during these steps is not affecting the quantitative measurement in the hypothesis of dye with a large molecular weight: the molecular weight of the buffer limits the dye evaporation and the result remains proportional to the amount of dye only.

General Description of Method to Measure the Amount of Aspirated Liquid

In a further aspect of the present disclosure, the amount of aspirated liquid from a vessel is measured by differential absorbance measurements. The difference of the optical absorbance before and after the liquid aspiration is carried out. In fact, during a liquid transfer, the amount of aspirated liquid can be different by the volume of dispensed liquid. A fraction of the liquid aspirated can remain trapped in the tip of the liquid delivery system. Additionally, the liquid that is present on the outer part of the tip is in a small amount but with a large surface exposed to the ambient air, therefore it evaporates in seconds. However, the evaporation may be selective, by keeping larger molecules onto the surface and letting lower molecular weight molecules (like water or alcohols) leaving the tip. Since most of the liquid handling operations are actually designed to transport—through a certain volume—a defined amount of sample molecules, this subtle effect is well represented by a sample composed by water and a high molecular weight dye.

General Description of Method to Measure the Loss of Liquid During Liquid Handling In another aspect of the present disclosure, the loss of liquid during liquid handling is carried out by monitoring the amount of aspirated and dispensed liquid. In fact, some liquid droplets can be trapped inside and outside the tip of the liquid delivery devices or simply evaporate during the liquid handling operations. Many factors can influence the amount of lost liquid through dripping: some of them are the surface tension of the liquid, the geometrical shape and the material of the tip of the liquid delivery device. This method can be used to characterize the performances of the tip of the liquid delivery system.

The loss of liquid during liquid handling is measured by comparing the aspirated liquid with respect to the dispensed liquid. By means of differential absorbance measurements, the same vessel can be used to aspirate and subsequently dispense the liquid in order to improve the accuracy and precision of the calculation.

Figure 3:
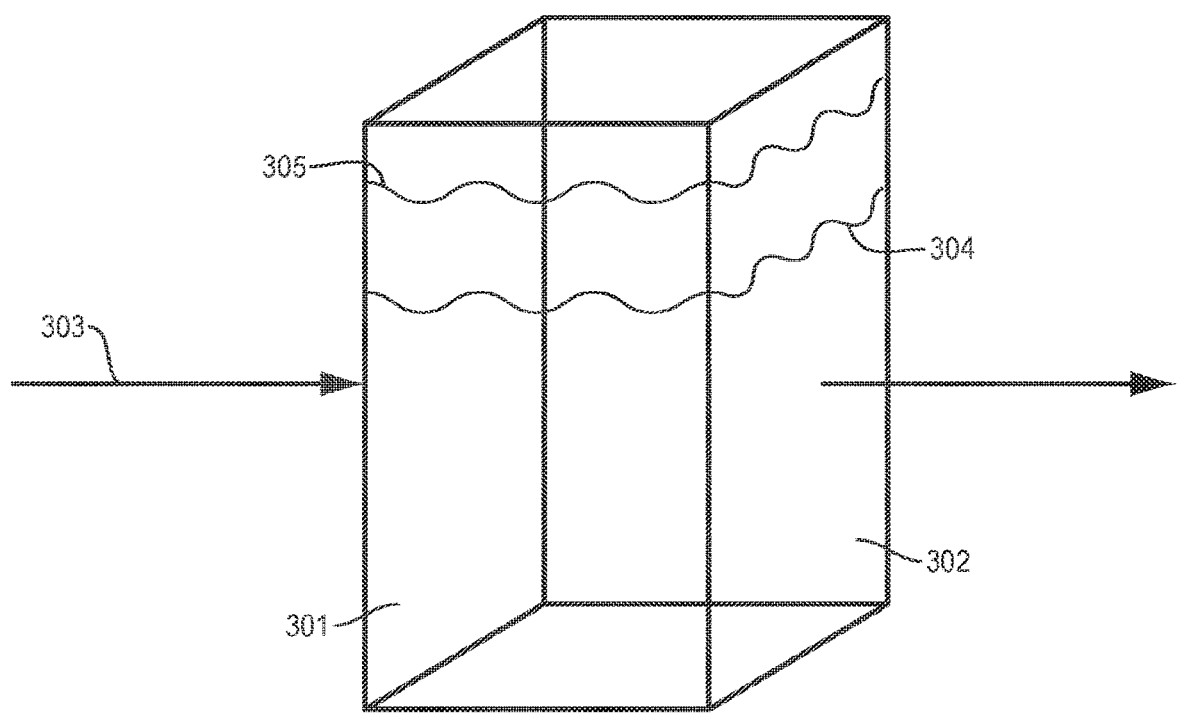
FIG. 3 is a schematic diagram of vessel having opposed parallel transparent wall that provide a fixed path length L.

General Description of a Compensation of the Dependence of Liquid Volume Measurement From Vessel Geometry In a further illustrative embodiment of the present disclosure, a method to compensate the dependence of the absorbance from the geometry of the destination vessel is provided. In one illustrative embodiment, the destination vessel is configured to have a constant optical path during aspiration and dispensing. FIG. 3 shows a destination vessel with constant optical path given by the opposite transparent parallel wall 301 and 302. The emitting beam 303 of the reader goes through the transparent wall 301 and 302 and a fraction of its intensity is absorbed the sample solution present in the vessel. Adding into the vessel more sample solution with higher or less concentration of the chromophore causes the solution volume to rise from the initial volume $V_0$ 304 to the final volume $V_1$ 305, without producing any change of the optical length or the cross-section of the vessel. The addition of liquid volume of the sample solution causes an increase of the total volume present in the vessel, but the variation of the absorbance is proportional only to the concentration of the chromophore. In fact, considering the initial absorption $A_0 = \varepsilon c_0 L$, the addition of sample solution with higher or lower concentration than the initial solution, will produce a final absorption $A_1 = \varepsilon c_1 L$. By means of differential measurement, the dispense volume is proportional to the different between the final and initial solution, namely $$V_{dispensed} \propto |A_1 - A_0| = |c_1 - c_0|$$

Figure 4:
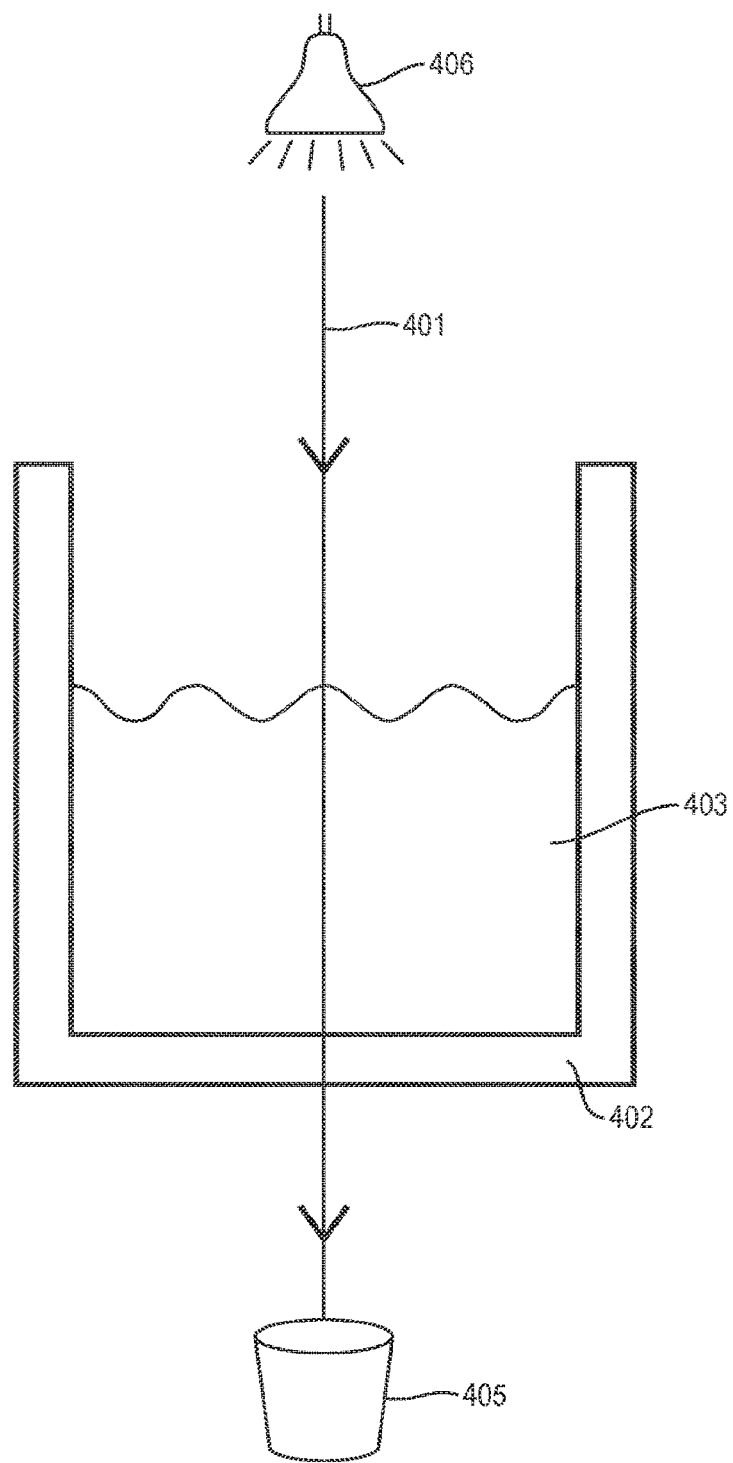
FIG. 4 shows a schematic cross-section of another embodiment of a destination vessel with a transparent flat bottom designed for vertical beam spectroscopy. The optical length depends on the amount of volume dispensed in the destination vessel.

In another illustrative embodiment, FIG. 4 shows a destination vessel with a variable volume of the solution along the direction of the emitting optical beam 401 of the reader. In this embodiment, such vessel has a transparent flat bottom 402. A perpendicular optical beam 401 travels though the sample solution 403 from the emitting source of the reader 404 to the detector 405 of the reader. In this illustrative embodiment, the optical length is proportional to the volume of the sample solution. In this embodiment, the addition of the liquid volume to be measured implies an increase of the material with the emitting beam goes through, so an increase of the optical path. If the vessel have a constant cross-section (e.g. cylindrical shape), the dispensed volume is proportional to the difference between the product of the optical length and the concentration, in particular $$V_{dispensed} \propto |A_1 - A_0| = |c_1 L_1 - c_0 L_0|$$

In the case of moulded plastic containers, the geometry of the vessel presents a de-moulding angle that causes a variation of the cross-section along optical path of the reader beam. The presence of such de-moulding angle can affect the accuracy of the liquid volume measurement, but it can be easily modelled through the approximate knowledge of the amount of liquid volume present in the vessel (through mathematical modelling or simply an empirical experimental determination)

In one illustrative embodiment, the deviation from the ideal shape of the vessel (e.g. conical shape) is measured by additional of subsequent amount of sample solution. The resulting calibration curve is then applied to each absorbance measurement during liquid volume determination.

In further illustrative embodiment, the measurement of absorbance is carried out by keeping the total amount of the liquid present in the destination vessel constant. Such method does not require applying any calibration curve related to the variation of the cross-section at vessel. In this embodiment, the optical path remains as constant as possible, minimizing possible inaccuracy of the absorbance measurement due to the beam optical behaviour, like aberrations or scattering or turbidity that may depend on the light path length inside the liquid.

General Description of Device to Remove Presence of Liquid Droplets on the External Surface of the Tip of Liquid Delivery Devices In another aspect of the present disclosure, the sample solutions are stored in sealed containers. Since the overall proportionality among volumes and absorbance is dependent on the concentration of the light-absorbing dye, and the light-absorbing dye has in general a different molecular weight in comparison with the buffer solvent (consisting of water, since water is the most used reference buffer for evaluation of liquid handling performances), the use of sealed containers has an evident advantage for the specific purpose. A specific implementation relies on the use of blister pack (also called blisters thereafter). Those blisters can contain one or a multiply of sample solutions, for the maximum user convenience and format. One-use sealed vessels constitute the ideal way to keep liquid samples in known and constant absorbance conditions, protecting the sample evaporation and minimizing unnecessary exposure to environmental light.

Figure 5:
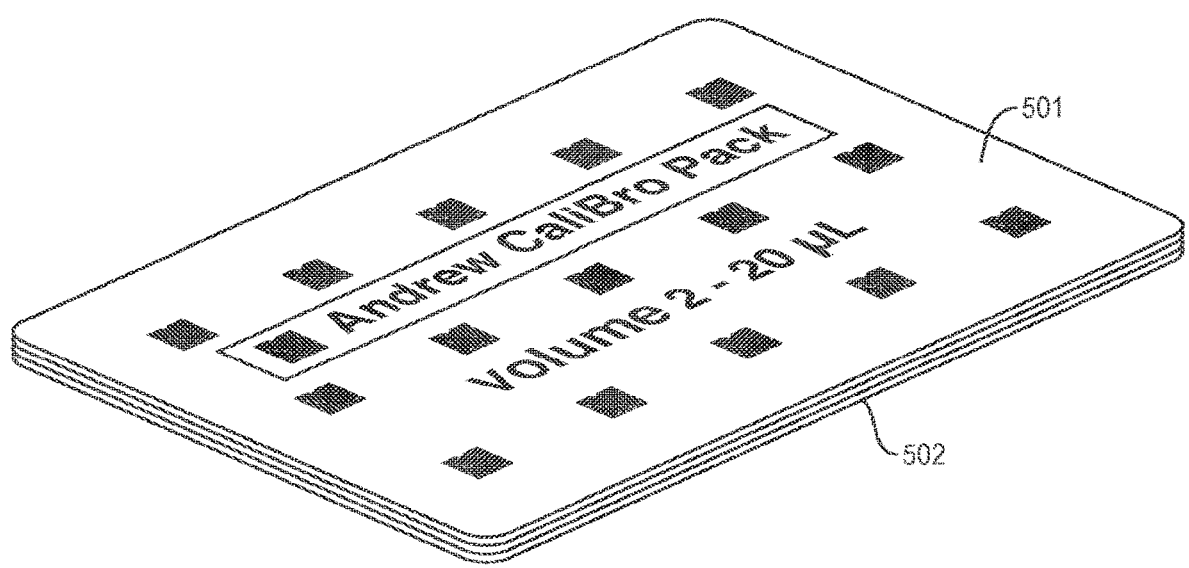
FIG. 5 shows a schematic representation of the blisters that contain the sample solutions used to measure the dispensed liquid volume.

A possible embodiment describing apparatus for storing sample solutions in blisters is FIG. 5. Those blisters are composed of a bottom part 501 and a top part 502. The bottom part is a thermoformed structure of one of multiple chambers. Each chamber contains a sample solution. The material of the bottom part must ideally be impermeable, resistant to chemicals, compatible to the sample solutions and opaque to light.

The top part of the blister is a thin or thick film that seals the bottom part of the blister in order to avoid leakage of the sample solution. Such film is design to be pierced by the tip of the liquid delivery device. The aperture created by the tip, while accessing the sample solution present in the blister, is designed not to be unnecessarily large, in order to be able to exert a cleaning action on the external surface of the tip, therefore removing liquid droplets. In case of the validation of the fluidic performance of liquid delivery devices, it is conceptually important to measure only the amount of transferred liquid inside the tip. For this reason, the liquid droplets that are present on the external surface of the tips should be considered a source of errors in the measurement of the dispensed liquid volume of the liquid delivery devices, since they contribute to the overall volume to be measured, and therefore should be avoided. It should be mentioned that during manual calibration operations it is well known for anybody skilled in the art that the presence of droplets on the outer part of the tip can compromise the measurement accuracy, and make it impossible to assess if the pipette in consideration complies to the standards or not.

In one illustrative embodiment, the material of the blisters is dark in order to prevent the chromophore to be exposed to ambient light. The ambient light can cause permanent damages to the molecules of chromophore (e.g. photo-bleaching) or temporary optical saturation that change the absorption property of the dye. The change of the absorption property of the chromophore causes inaccuracy of the measurement of the liquid volume.

General Description of Device to Avoid Particle Contamination in Blisters

In another aspect of the present disclosure, the top part of the blister is cover by a protective peelable film. In fact, the presence of external particles located on the external surface of the blister can enter the blister once pierced. To avoid a possible contamination of the sample solution, the protective film should be removed by the operator from the blister just before use. The external particles remain on the peelable film and the top surface of the blister is particle-free. This method or device can be considered a more general solution applicable to different types of pierceable sealed containers used for different purposes, for example containers used in the industry to perform serial dilution with food materials for the purpose of microbiology assessments. The peelable film could be manufactured in different ways, for example through co-extrusion of the pierceable and peelable film, a method capable of guaranteeing an uncontaminated surface at the junction of the two films.

General Description of Blister Markers

In yet another aspect of the present disclosure, the blisters are equipped with optical, magnetic or electronic machine-readable markers that contain information about the sample solution. Some examples of possible information stored in the markers are expiration date of the sample solution, absorptivity of the chromophore and concentration of the chromophore in the sample solution.

Figure 6:
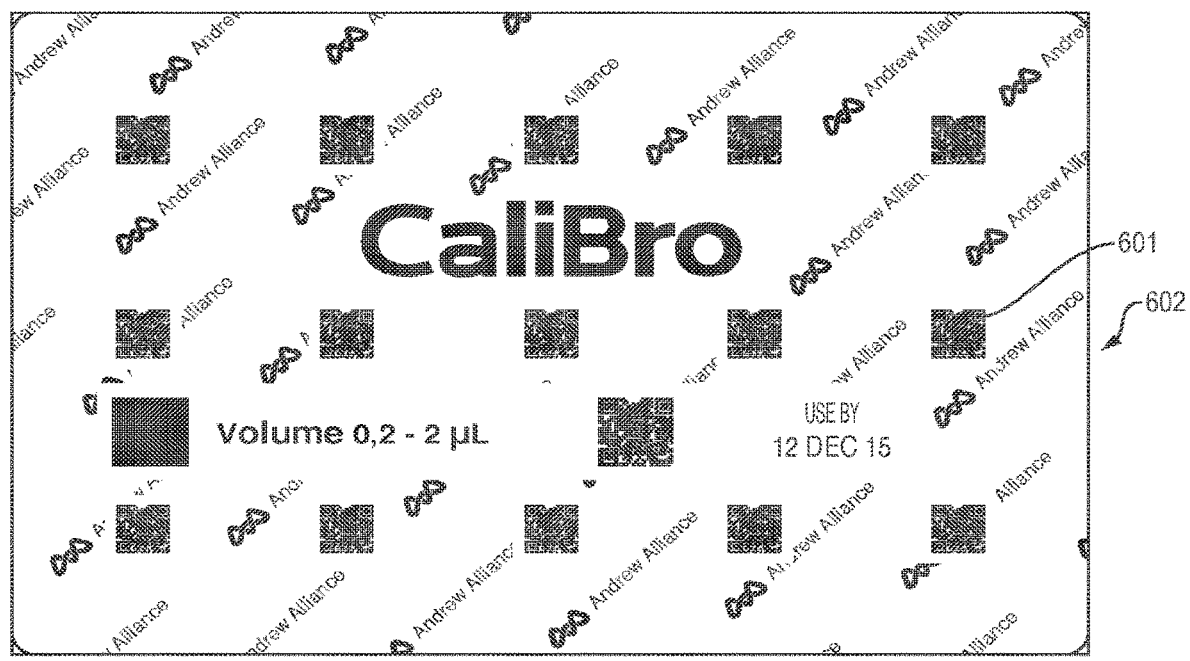
FIG. 6 shows a schematic representation of the blister top surface equipped with markers.

FIG. 6 shows one illustrative embodiment of a blister equipped with machine-readable markers 602 present on the top surface 601. Liquid delivery devices can automatically access information about the position of the blister and type of the sample solutions present in the container.

General Description of Method and Device to Recognize Used Blisters

Figure 7:
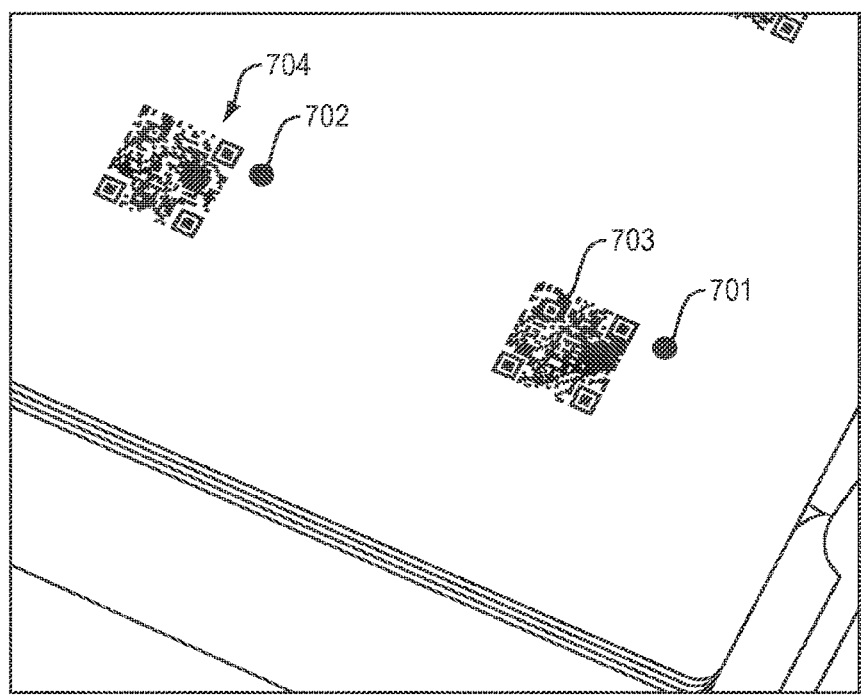
FIG. 7 shows devices and methods for the recognition of the used blister chambers.

The recognition of the used chambers of a blister can be automatically carried out by means of image acquisition and processing of the top surface of the blister. The tip of the liquid delivery device in order to access to the sample solution creates an aperture in the thin film of the top surface of the blister. In one embodiment, the used chamber of the blister is identified by direct recognition of the aperture on the blister film by means of image analysis. FIG. 7 describes the apertures 701 and 703 created by the tip of the liquid delivery after aspirating the sample solution present in the blister. It can be remarked that, for each chamber, two apertures have been made: in this case, the purpose is to allow for a proper air circulation, avoiding that a chamber pressure above or below the environmental pressure modifies the volume being aspirated or dispensed.

In yet another embodiment, the recognition of the used chamber is achieved using some markers on top of the chamber of the blister. The aperture created by the tip of the liquid delivery device permanently damages the markers 703 and 704 preventing their recognition.

General Description of Method to Determine the Liquid Handling Performances by Means of a Pigment In the current practice, liquid handling performances are primarily assessed by gravimetric or photometric methods. Photometric methods exploit dyes absorbing the light at specific wavelengths, and the wavelength-dependent information is sometimes used for a spectral analysis (dual dyes approach) allowing to better normalize and calibrate the absolute absorbance of the dye. In fact, temperature and many other parameters, like pH, can affect the dye absorbance and modify the result if not suitably corrected.

In the present disclosure, we disclose the benefits of substituting dyes with colloids. In the present disclosure, we define colloids in the broadest sense, and including any suspension or pigment or emulsion as synonyms, as a system containing finely divided particles with dimensions between 1 and 1000 nm. Essentially, we propose the replacement of the absorption properties of certain molecules by the light absorption and scattering of physical particles composed by many molecules, and directly interacting with the light as a unit. As a clarification, there is a clear distinction between a pigment, which is insoluble in its vehicle (resulting in a colloid), and a dye, which either is itself a liquid or is soluble in its vehicle (resulting in a solution). A light absorbing system or colorant can be either a pigment or a dye depending on the vehicle involved.

There are multiple reasons to consider colloids as a replacement of dyes. First, the absorption process is more stable, being founded on physical characteristics of the aggregates and not on molecular characteristics that may be affected, for example, by temperature and pH. Also, a significant number of colloids exhibit spectral absorption properties that are less variable with the wavelength of the light, making the absorption properties at one wavelength or in a certain spectrum of wavelength intrinsically more stable. As an extreme example, we report the absorption properties of carbon black, a suitable pigment for black inks and neutral absorption filters that is essentially stable and constant over the visible spectrum: a modulation of the excitation wavelength of the light does not induce any modification of the absorbed light. Also, typical carbon-black based inks contain particles with size below 200 nm that hardly sediment due to the significant role of Brownian motion—making the stability of the dye excellent in the long term. At sufficient dilution factors, the liquid containing those particles behaves, in all aspects, like pure water—and the evaporation rate of the light absorbing particles is essentially negligible making the stability of the method far better than with a dye.

The specification is most thoroughly understood in light of the teachings of the references cited within the specification. The embodiments within the specification provide an illustration of embodiments of the invention and should not be construed to limit the scope of the invention. One skilled in the art readily recognizes that many other embodiments are encompassed by the invention. Those skilled in the art will recognize, or be able to ascertain using no more than routine experimentation, many equivalents to the specific embodiments of the invention described herein. Such equivalents are intended to be encompassed by the following appended claims.

What is claimed is:

1. A method for determining the volume of a liquid sample having a known optical absorbance at a defined wavelength or optical spectrum, the method comprising:
   measuring an absorbance of a first volume of a liquid sample in a destination vessel based on an optical beam passing through the first volume of the liquid sample, in the destination vessel, wherein the optical beam crosses an unconstrained liquid surface;
   dispensing a second volume of the liquid sample into the destination vessel, wherein the liquid sample of the second volume is the same liquid sample as the liquid sample of the first volume;
   measuring an absorbance of the first and second volumes of the liquid sample in the destination vessel based on the optical beam passing through the first and second volumes of the liquid sample in the destination vessel, wherein the optical beam crosses the unconstrained liquid surface; and
   determining the second volume of the liquid sample based on a difference of the measurements of the absorbance of the first volume and the absorbance of the first and second volumes.

2. The method of claim 1 further comprising dispensing the first volume of the liquid sample into the destination vessel before measuring the absorbance of the first volume.

3. The method of claim 2 further comprising aspirating the first volume and aspirating the second volume from a source vessel prior to dispensing the first volume and dispensing the second volume, respectively.

4. The method of claim 1 wherein the liquid sample comprises a known concentration of a light-absorbing dye.

5. The method of claim 1 further comprising:
   dispensing a third volume of the liquid sample into the destination vessel;
   measuring an absorbance of the first, second and third volumes of the liquid sample in the destination vessel based on the optical beam passing through the first, second and third volumes of the liquid sample in the destination vessel, wherein the optical beam crosses the unconstrained liquid surface; and
   determining the third volume of the liquid sample based on a difference of the measurements of the absorbance of the first and second volumes and the absorbance of the first, second and third volumes.

6. The method of claim 1 wherein the unconstrained liquid surface has a meniscus shape.

7. A method for determining the volume of a liquid sample having a known optical absorbance at a defined wavelength or optical spectrum, the method comprising:
   measuring an absorbance of a first volume of a liquid sample in a vessel based on an optical beam passing through the first volume of the liquid sample in the destination vessel, wherein the optical beam crosses an unconstrained liquid surface;
   aspirating a second volume of the liquid sample from the vessel, wherein the liquid sample of the second volume is the same liquid sample as the liquid sample of the first volume;
   measuring an absorbance of a first remaining volume of the liquid sample in the vessel after the aspiration of the second volume based on the optical beam passing through the first remaining volume, wherein the optical beam crosses the unconstrained liquid surface and wherein the first remaining volume is defined as a difference between the first and second volumes; and determining the second volume of the liquid sample based on a difference of the measurements of the absorbance of the first volume and the absorbance of the first remaining volume.

8. The method of claim 7 wherein the liquid sample comprises a known concentration of a light-absorbing dye.

9. The method of claim 7 further comprising:

aspirating a third volume of the liquid sample from the vessel;

measuring an absorbance of a second remaining volume of the liquid sample in the vessel based on the optical beam passing through the second remaining volume of the liquid sample in the vessel after aspiration of the third volume, wherein the optical beam crosses the unconstrained liquid surface and wherein the second remaining volume is defined as a difference between the first remaining volume and the third volume; and determining the third volume of the liquid sample based on a difference of the measurements of the absorbance of the first remaining volume and the absorbance of the second remaining volume.

10. The method of claim 7 wherein the unconstrained liquid surface has a meniscus shape.

* * * * *